United States Patent [19]
Gellert et al.

[11] Patent Number: 5,935,621
[45] Date of Patent: Aug. 10, 1999

[54] INJECTION MOLDING APPARATUS HAVING A COOLED CORE

[75] Inventors: Jobst Ulrich Gellert, Georgetown; Denis L. Babin, Acton; Hans Guenther, Georgetown, all of Canada

[73] Assignee: Mold-Masters Limited, Georgetown, Canada

[21] Appl. No.: 09/008,995

[22] Filed: Jan. 20, 1998

Related U.S. Application Data

[63] Continuation-in-part of application No. 08/802,048, Feb. 18, 1997, abandoned.

[30] Foreign Application Priority Data

Jan. 24, 1997 [CA] Canada .................................. 21959074
Dec. 19, 1997 [CA] Canada .................................. 2224796

[51] Int. Cl.⁶ .................................................. B29C 45/73
[52] U.S. Cl. .......................................... 425/549; 425/552
[58] Field of Search ............................ 425/547, 548, 425/549, 552, 568

[56] References Cited

U.S. PATENT DOCUMENTS

| | | | |
|---|---|---|---|
| 3,760,874 | 9/1973 | Boskovic | 425/552 |
| 4,622,001 | 11/1986 | Bright et al. | 425/549 |
| 4,655,280 | 4/1987 | Takahashi | 425/547 |
| 4,800,953 | 1/1989 | Veldhoff | 425/547 |
| 4,966,544 | 10/1990 | Mitake | 425/552 |
| 5,094,603 | 3/1992 | Gellert | 425/549 |
| 5,443,381 | 8/1995 | Gellert | 425/549 |

*Primary Examiner*—Tim Heitbrink
*Attorney, Agent, or Firm*—Dalesman & Company

[57] ABSTRACT

Injection molding hot runner apparatus having a cooled mold core with an elongated body portion with a front portion or head. A cooling tube extends centrally in body portion of the mold core. A cooling fluid circuit extends from the open front end of the cooling tube outwardly through a number of spaced radial bores. Each radial bore connects to an L-shaped duct leading back to a cylindrical space around the cooling tube.

9 Claims, 6 Drawing Sheets

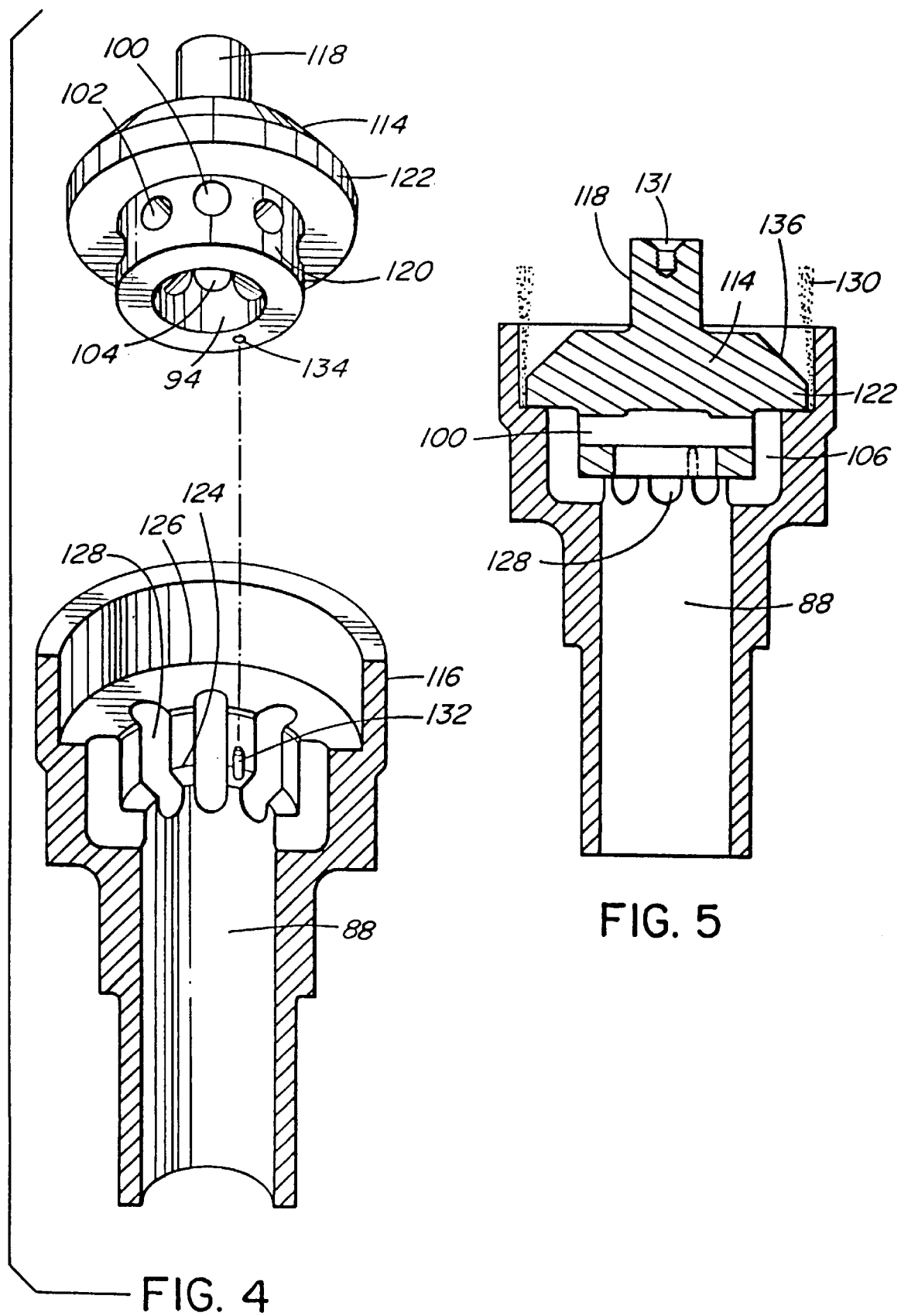

5,935,621

INJECTION MOLDING APPARATUS HAVING A COOLED CORE

This application is a Continuation-in-part of application Ser. No. 08/802,048 filed Feb. 18, 1997 now abandoned.

BACKGROUND OF THE INVENTION

This invention relates generally to injection molding and more particularly to hot runner apparatus having improved cooling provided by the circulation of cooling fluid through spaced openings in a front portion of an elongated core.

The cycle time of hot runner injection molding systems can be reduced by providing increased cooling to the cavity. Reducing cycle time by even a fraction of a second is very important in large volume applications such as making closures with millions or even billions of moldings. As seen in U.S. Pat. No. 5,094,603 to Gellert which issued Mar. 10, 1992, it is well known to provide the mold with a cooled core by circulating cooling water through a central cooling tube in the core. While this is satisfactory for many applications, there is still a considerable delay in the molding cycle before the mold is opened for ejection waiting for the melt to solidify. As the front portion of the cooled core forms part of the cavity, improved cooling must be achieved without unduly reducing the structural strength of this front portion of the cooled core.

SUMMARY OF THE INVENTION

Accordingly, it is an object of the present invention to at least partially overcome the disadvantages of the prior art by providing a cooled core with spaced openings in a front portion through which cooling fluid is circulated to improve cooling to the cavity.

To this end, in one of its aspects, the invention provides an injection molding hot runner apparatus having one or more heated nozzles seated in a cooled mold to convey melt to a gate leading to a cavity. The mold has one or more cooled cores having an elongated body portion, a central bore, and a front end. The cooled core has a front portion having an outer surface forming one side of the cavity extending around the front portion of the cooled core. The cooled core has a central cooling tube extending in its central bore with a first cylindrical space extending between the cooling tube and the surrounding body portion. The central cooling tube has an open front end inside the front portion of the cooled core, whereby a cooling fluid circuit is provided extending inside the cooling tube and along the first cylindrical space outside the cooling tube to cool the cooled core. The improvement comprises the front portion of the at least one cooled core having a number of spaced openings extending outwardly therein through which the cooling fluid circuit extends. Each opening has an inner end and an outer end. The inner end of each opening is located adjacent the open front end of the cooling tube to receive cooling fluid therefrom. The outer end of each opening is connected by rearwardly and inwardly extending cooling fluid flow means to the first cylindrical space extending rearwardly between the cooling tube and the surrounding body portion of the cooled core.

Further objects and advantages of the invention will appears from the following description taken together with the accompanying drawings.

BRIEF DESCRIPTION OF THE DRAWINGS

FIG. 4 is a partially cut-away isometric view showing the insert in position for mounting in the body portion of the cooled core, FIG. 5 is a sectional view of them assembled together for brazing.

DETAILED DESCRIPTION OF THE INVENTION

Figure 1:
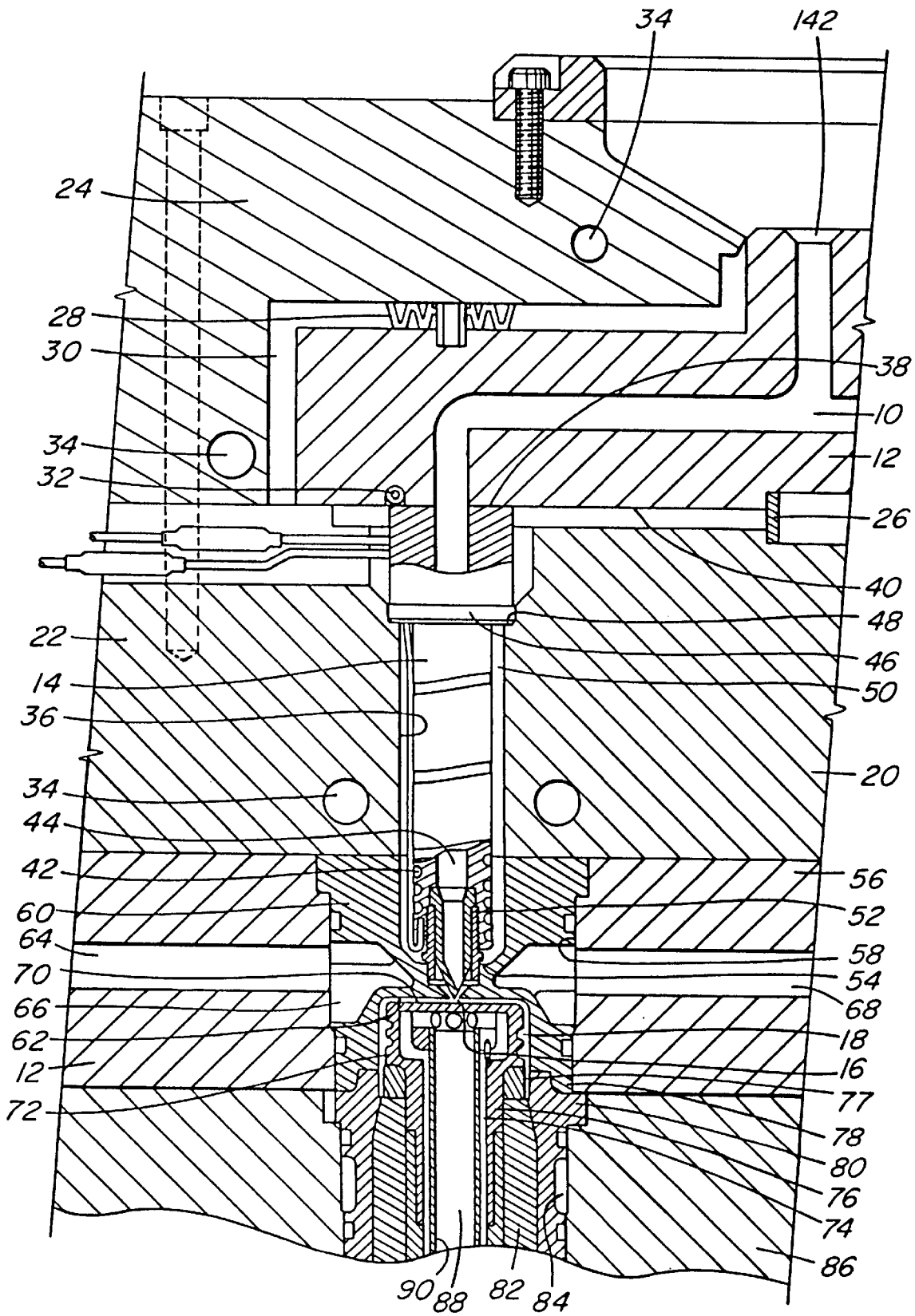
FIG. 1 is a sectional view showing a portion of a multi-cavity injection molding system showing a cooled core according to one embodiment of the invention.

Reference is first made to FIG. 1 which shows a portion of a multi-cavity hot runner injection molding system or apparatus wherein a melt passage 10 branches in a melt distribution manifold 12 to convey hot melt through each heated nozzle 14 to a gate 16 leading to a cavity 18. While the configuration of the mold 20 depends upon the application, in this case the melt distribution manifold 12 which interconnects the nozzles 14 is mounted between the nozzle retainer plate 22 and the back plate 24 by a central locating ring 26 and insulative and resilient spacer members 28. As can be seen, this provides an insulative air space 30 between the melt distribution manifold 12 which is heated by an integral electrical heating element 32 and the surrounding nozzle retainer plate 22 and back plate 24 which are cooled by pumping cooling water through cooling conduits 34. Each nozzle 14 extends through an opening 36 in the nozzle plate 22 with its rear end 38 abutting against the front surface 40 of the melt distribution manifold 12. It is heated by an electrical heating element 42 which extends around a central bore 44 through which the melt passage 10 extends. The nozzle 14 has a forwardly extending flange portion 46 which sits on a circular seat 48 in the nozzle retainer plate 22 to locate the nozzle 12 with an insulative air space 50 between it and the surrounding mold 20. In this case, a two-piece nozzle seal 52 is mounted in the front end 54 of each nozzle 14 leading to the aligned gate 16.

As also seen in FIG. 1, the mold 20 also includes a cavity retainer plate 56 through which holes 58 extend to receive a cavity insert 60 aligned with each nozzle 14. As described in U.S. Pat. No. 5,443,381 to Gellert which issued Aug. 22, 1995, the cavity insert 60 has a front surface 62 which is shaped to form one side of the cavity 18. Cooling is provided to each cavity insert 60 by cooling water from an inlet 64 flowing through tortuous passages 66 to an outlet 68.

The other side of the cavity 18 is formed by the outer surface 70 of the front portion or head 72 of a cooled core 74 according to the invention. The cooled core 74 has an elongated body portion 76 which in this embodiment has the front portion or head 72 which is substantially larger in diameter than the rest of the cooled core 74. In the configuration shown, a thin portion 77 of the cavity 18 extends between a cavity ring 78 and a stripper ring 80. The cavity ring 78 is held in place by a core guide 82 which extends around the body portion 76 of the core 74. The stripper ring 80 is received in an opening 84 in a stripper plate 86.

Figure 2:
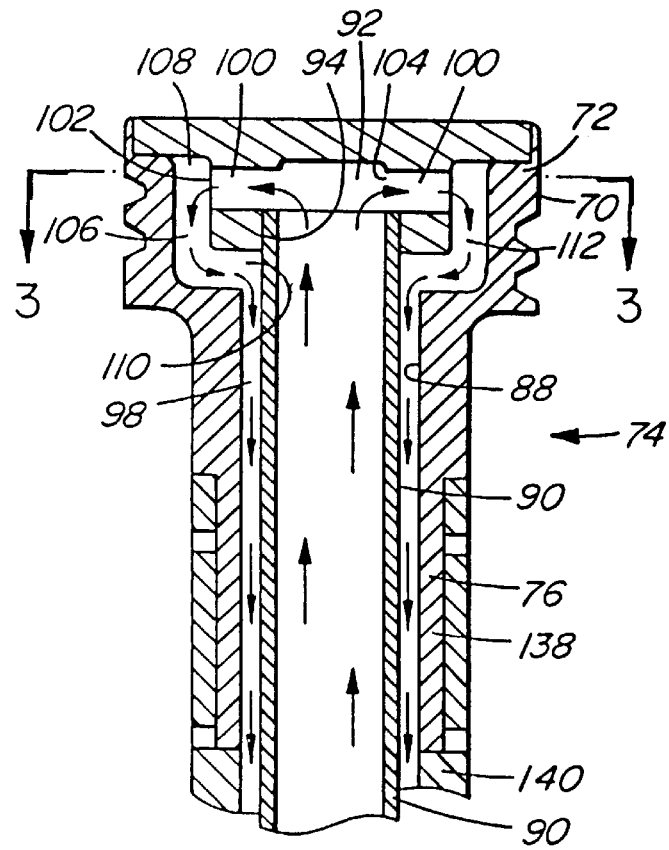
FIG. 2 is a larger sectional view of the cooled core seen in FIG. 1.
Figure 3:
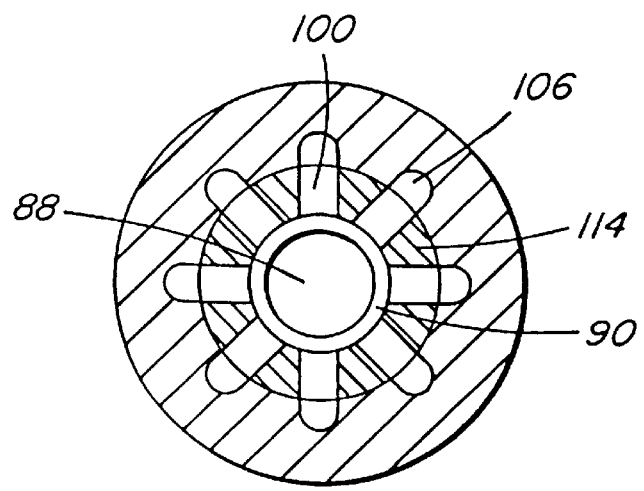
FIG. 3 is a sectional view taken along line 3—3 in FIG. 2.

Referring now to FIGS. 2 and 3, it can be seen that the elongated body portion 76 of the cooled core 74 has a central bore 88 extending into the head 72. A cooling tube 90 extends through the central bore 88 in the elongated body portion 76 to an open front end 92 in the head 72. The front end 92 of the cooling tube 90 is threaded and screws into the threaded portion 94 of the central bore 88 in the front portion or head 72. The cooling tube 90 is sufficiently smaller in diameter than central bore 88 to provide an elongated cylindrical space 98 between the cooling tube 90 and the surrounding body portion 76 of the cooled core 74. The front portion or head 72 of the elongated body portion 76 of the cooled core 74 has a number of outwardly extending radial bores 100 equally spaced around it. Each radial bore 100 has an outer end 102 and an inner end 104 extending from the central bore 88 adjacent the open front end 92 of the cooling tube 90. In the embodiment shown, the head 72 has eight radial bores 100, but there can be a different number in other embodiments. The head 72 of the cooled core 74 also has an equal number of forwardly extending L-shaped ducts 106, each having a rear end 108 and an inner end 110. The rear end 108 of each L-shaped duct 106 connects with the outer end 102 of one of the radial bores 100 and the inner end 110 of each L-shaped duct 106 connects with the cylindrical space 98 between the cooling tube 90 and the surrounding body portion 76 of the cooled core 74. Thus, as shown by the arrows in FIG. 2, the core 74 has a circuit 112 for a suitable cooling fluid such as water flowing through the cooling tube 90, radially outward through the radial bores 100, along the head 72 and back in through the L-shaped ducts 106, and along the cylindrical space 98 around the cooling tube 90. Of course, in other embodiments, the direction of flow through the circuit can be the opposite.

Reference is now made to FIGS. 4 and 5 in describing how the cooled core 74 according to the invention is made. Firstly, an insert 114 and the elongated body portion 76 are machined of a suitable material such as H13 tool steel. In other embodiments, the insert 114 can be made of a more thermally conductive material such as a beryllium copper alloy to further improve cooling. As can be seen, in this embodiment the insert 114 is made with an upwardly extending stem portion 118 and a cylindrical portion 120 extending forwardly from a larger diameter circular flange portion 122. The cylindrical portion 120 has the radial bores 100 extending outwardly adjacent the threaded portion 94 of the central bore 88 in the head 72 which receives the open end 92 of the cooling tube 90. The body portion 76 is made with the central bore 88 extending to a first seat 124 which extends outwardly and upwardly to a larger diameter second seat 126. L-shaped grooves 128 are machined in the first seat 124 to form the L-shaped ducts 106 when the insert 114 and body portion 76 are assembled together. The first seat 124 is made to fit around the cylindrical portion 120 of the insert 114. Similarly, the second seat 126 is made to fit around the flange portion 122 of the insert 114. The body portion 76 is mounted in an upright position and the insert 114 is lowered into the position shown in FIG. 4 with the cylindrical portion 120 resting on the first seat 124 and the circular flange portion 122 resting on the second seat 126. The body portion 76 has a pin 132 extending upwardly from the first seat 124 which fits in a matching hole 134 in the cylindrical portion 120 of the insert 114 to ensure that the radial bores 100 in the insert 114 are aligned with the L-shaped grooves 128 in the body portion 76. A quantity of a suitable material such as powdered nickel alloy 130 is poured around the flange portion 122 of the insert 114 which has a bevelled rear surface 136 to direct the powder 130 into place. The insert and body portion 76 are then loaded into a vacuum furnace and gradually heated to a temperature of approximately 1925° F. which is above the melting temperature of the nickel alloy. As the furnace is heated, it is evacuated to a relatively high vacuum to remove substantially all of the oxygen and then partially backfilled with an inert gas such as argon or nitrogen. When the melting point of the nickel alloy is reached, the nickel alloy 130 melts and flows downwardly around the flange portion 122 and between the contacting surfaces of the insert 114 and the body portion 76. The nickel alloy 130 spreads between them by capillary action to integrally braze the insert 114 and body portion 76 together to form an integral core 74. The cooled core 74 has a center 131 which is used to machine grind threads on the outer surface 70 of the head 72 of the cooled core 74. The cooled core 74 is then machined to remove the stem portion 118 and to reduce the distance of the outer surface 70 of the head 72 is from the cooling fluid circuit 112 and the cooling tube 90 is screwed into place in the central bore 88 of the core 74. While this configuration with the L-shaped grooves 128 being machined in the body portion 76 provides an optimum combination of structural strength and cooling provided by the proximity of the cooling fluid circuit 112 to the outer surfaces 70 of the head 72, in an alternate embodiment, the L-shaped ducts 106 can be made by machining L-shaped grooves in the insert 114 rather than in the body portion 76. In the embodiment shown, as seen in FIG. 2, the cooled core 74 is only one part 138 which is joined to another overlapping conventional part 140 to form an elongated cooled core 74. In this case, the one part 138 is made by the manufacturer and shipped to the mold maker to be brazed or welded to the other part 140. Of course, in another embodiment, the entire cooled core can be made by one party without requiring two parts.

In use, after the system has been assembled as shown in FIG. 1, electrical power is applied to the heating elements 32, 42 to heat the manifold 12 and the nozzles 14 to a predetermined operating temperature. Cooling water is also circulated by pumps (not shown) through the cooling conduits 34, the cooling passages 66 in the cavity inserts 60, and the cooling fluid circuits 112 in the mold cores 74 to cool the mold 20. Pressurized melt from a molding machine (not shown) is then introduced according to a predetermined cycle into the central inlet 142 of the melt passage 10 of the manifold 12, from where it flows through the melt bore 44 of each nozzle 14 to fill the cavities 18. After the cavities 18 are full, injection pressure is held momentarily to pack and then released. After a short cooling period, the mold 20 is opened to eject the product. After ejection, the mold 20 is closed the injection pressure is reapplied to refill the cavities 18. This cycle is repeated in a continuous cycle with a frequency dependent on the size and shape of the cavities 18 and the type of material being molded. Providing the radial bores 100 for the cooling fluid to flow out into the head 72 of the mold core 74 improves cooling and reduces injection cycle time by the close proximity of the cooling circuit 112 to the cavity 18. Providing the L-shaped ducts 106 allows maximum surface contact between the insert 114 and body portion 76 and gives the integral mold core 74 the necessary structural strength to withstand injection pressures. The combination of the radial bores 100 and L-shaped ducts 106 ensures turbulent flow of the cooling water through the circuit 112 which further improves cooling efficiency.

Figure 6:
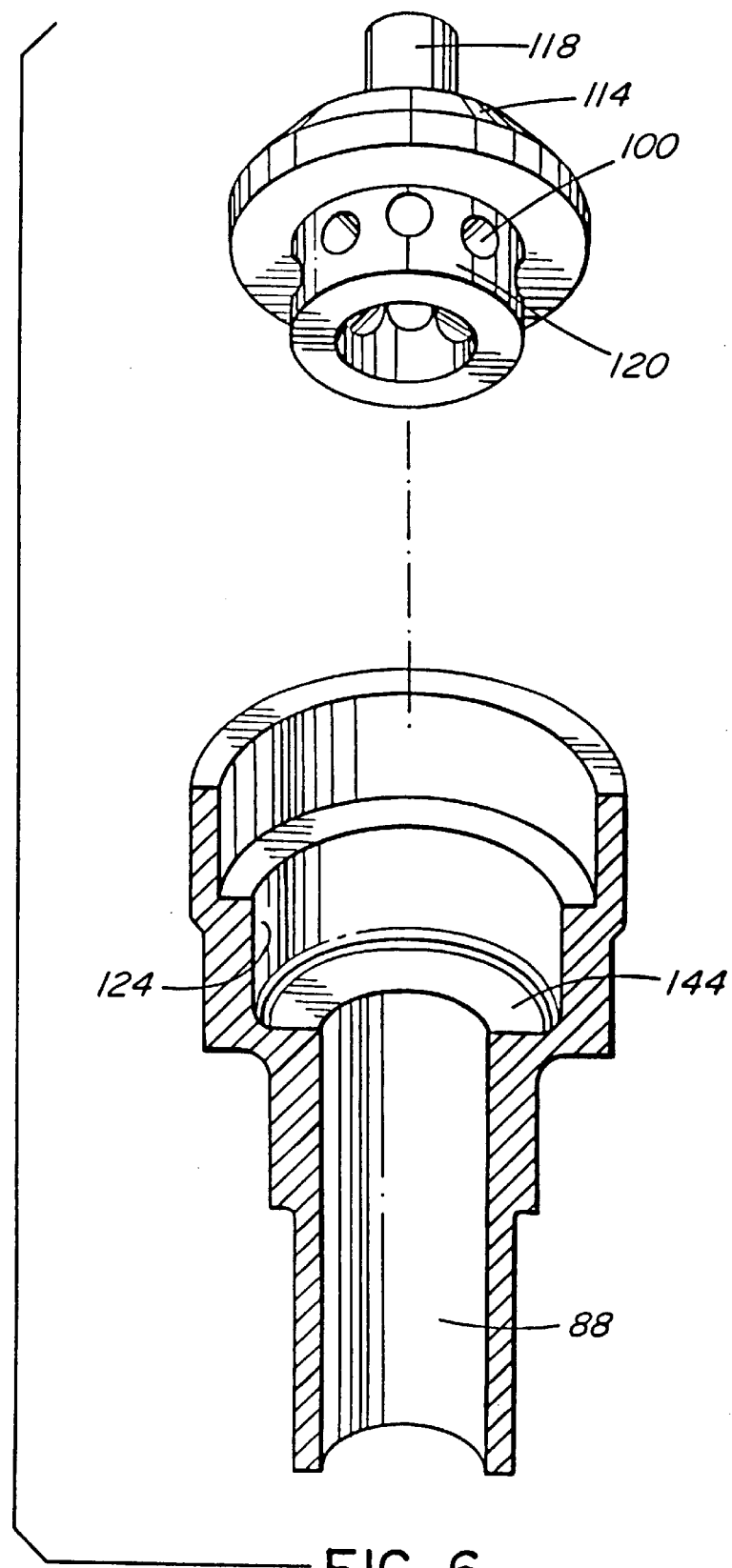
FIG. 6 is an isometric view similar to FIG. 4 showing the insert and body portion of a cooled core according to a second embodiment of the invention.

Reference is now made to FIG. 6 to describe another embodiment of the invention. This embodiment is the same as that described above except that the radial bores 100 extend out to a single L-shaped space 144 extending continuously around between the cylindrical portion 120 of the insert 114 and the first seat 124 of the body portion 76. While this embodiment of the cooled core does not have as much structural strength as the embodiment described above, it is sufficient for some applications.

Figure 7:
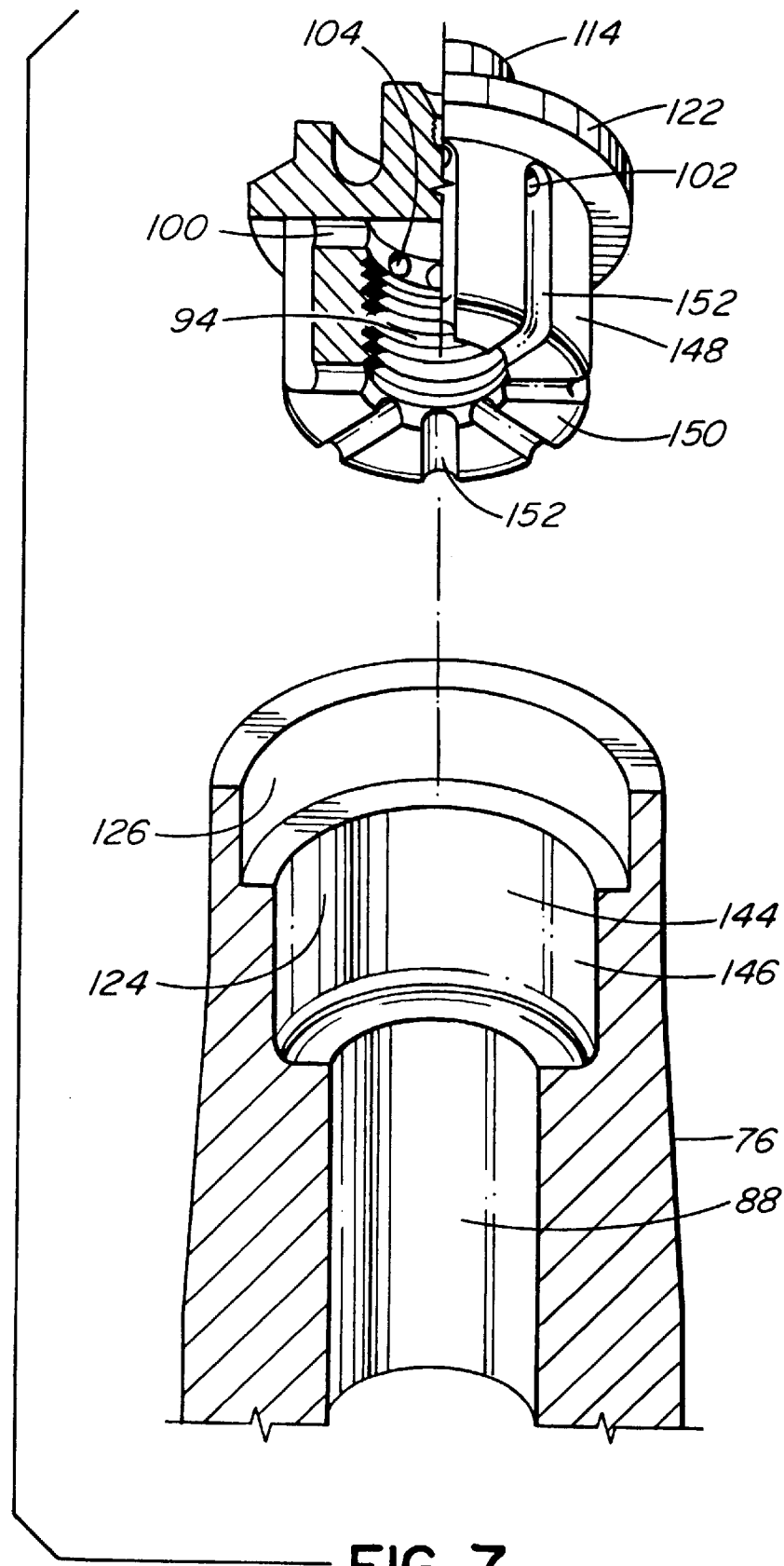
FIG. 7 is a similar isometric view of a further embodiment of the invention.
Figure 8:
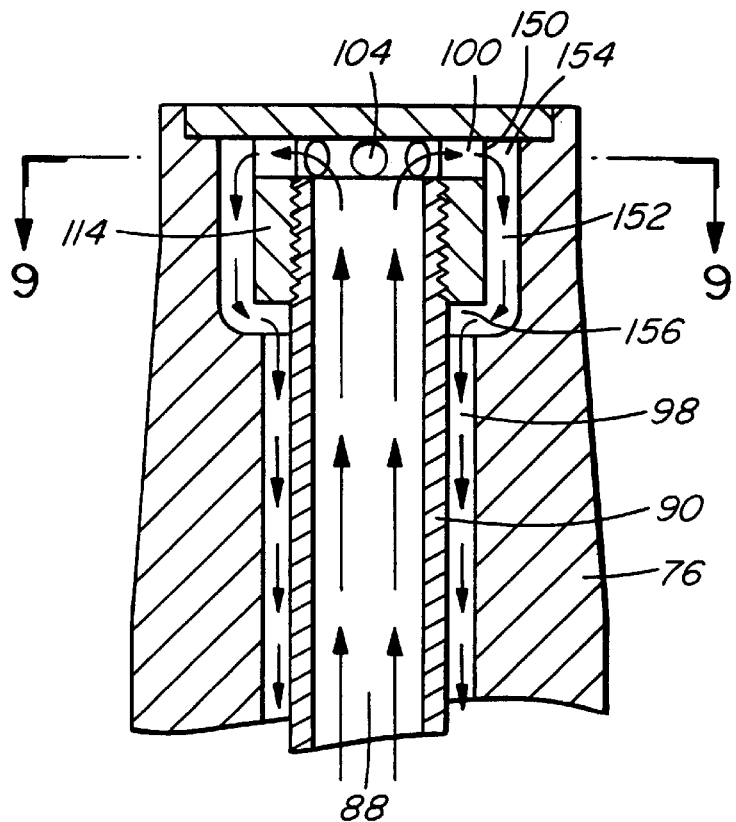
FIG. 8 is a sectional view of the cooled core according to this further embodiment.
Figure 9:
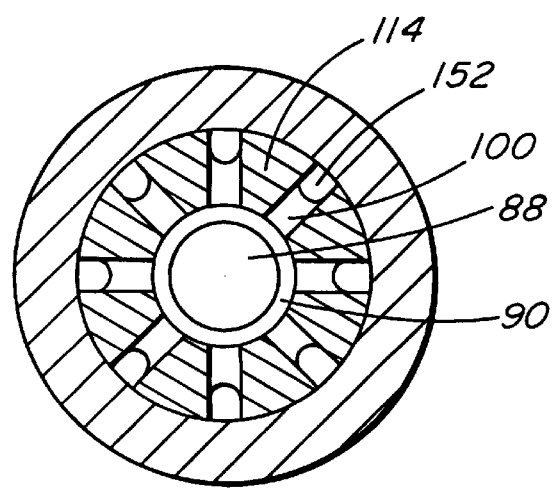
FIG. 9 is a sectional view taken along line 9—9 in FIG. 8.

Reference is now made to FIGS. 7–9 to describe a further embodiment of the invention. In this embodiment, the shape of the elongated body portion 76 is somewhat different, but it has the first and second seats 124, 126 extending from the central bore 88 similar to those shown in FIG. 6. The portion 144 of the elongated body portion 76 forming the first seat 124 has a generally cylindrical inner wall 146. The insert 114 has a generally cylindrical outer surface 148 extending from the flange portion 122 to a generally flat front end 150. The cylindrical outer surface 148 of the insert 114 fits within the cylindrical inner wall 146 of the elongated body portion 76. The insert 114 again has a number of spaced bores 100 extending radially therethrough from the outer cylindrical surface 148 adjacent the threaded portion 94 of the central bore 88. In this embodiment, the insert 114 has a number of spaced L-shaped grooves 152 extending in the generally cylindrical outer surface 148 and generally flat front end 150. The rear end 154 of each L-shaped groove 152 connects with the outer end 150 of one of the radial bores 100 and the inner end 156 of each L-shaped groove 152 connects with the cylindrical space 98 between the cooling tube 90 and the surrounding elongated body portion 76 of the cooled core 74. Thus, as shown by the arrows in FIG. 8, the cooled core 74 has a circuit 112 for a suitable cooling fluid such as water flowing through the cooling tube 90, radially outward through the radial bores 100, back through the L-shaped grooves 152, and along the cylindrical space 98 around the cooling tube 90. Of course, in other embodiments, the direction of flow through the circuit can be reversed. In addition to providing improved cooling by turbulent flow and increased structural strength, the L-shaped grooves 152 being entirely in the insert 114 provides the advantage that the insert 114 does not have to be accurately oriented when mounted in the body portion 76.

While the description of the cooled mold core 74 with the cooling fluid circuit 112 extending outwardly in its front portion or head 72 has been given with respect to preferred embodiments, it will be evident that various other modifications are possible without departing from the scope of the invention as understood by those skilled in the art and as provided in the following claims.

The embodiments of the invention in which an exclusive property or privilege is claimed is defined as follows:

1. In an injection molding hot runner apparatus having at least one heated nozzle seated in a cooled mold to convey melt to a gate leading to a cavity, and at least one cooled core having an elongated body portion, a central bore, and a front end to provide the at least one cooled core with a front portion having an outer surface forming one side of at least a portion of the cavity extending around the front portion of the cooled core, the cooled core having a central cooling tube extending in the central bore of the cooled core with a first cylindrical space extending between the cooling tube and the surrounding body portion of the cooled core, the central cooling tube having an open front end inside the front portion of the cooled core, whereby a cooling fluid circuit is provided extending inside the cooling tube and along the first cylindrical space outside the cooling tube to cool the cooled core, the improvement wherein;

the front portion of the at least one cooled core has a plurality of spaced openings extending outwardly therein through which the cooling fluid circuit extends, each opening having an inner end and an outer end, the inner end of each opening being located adjacent the open front end of the cooling tube to receive cooling fluid therefrom, the outer end of each opening being connected by rearwardly and inwardly extending cooling fluid flow means to the first cylindrical space extending rearwardly between the cooling tube and the surrounding body portion of the cooled core.

2. Injection molding apparatus as claimed in claim 1 wherein the outwardly extending spaced openings are radially extending bores.

3. Injection molding apparatus as claimed in claim 2 wherein the rearwardly and inwardly extending cooling fluid flow means comprises a plurality of spaced L-shaped ducts, each L-shaped duct having a rear end and an inner end, the rear end being connected to the outer end of one of the radially extending bores, the inner end being connected to the first cylindrical space extending rearwardly between the cooling tube and the surrounding body portion of the cooled core.

4. Injection molding apparatus as claimed in claim 3 wherein the front portion of the at least one cooled core comprises a head which is substantially larger in diameter than the rest of the cooled core.

5. Injection molding apparatus as claimed in claim 4 wherein the rearwardly and inwardly extending cooling fluid flow means comprises a second cylindrical space extending rearwardly to a rear end from the outer ends of the radially extending bores and a radially extending space extending inwardly from the rear end of the second cylindrical space to the first cylindrical space extending rearwardly between the cooling tube and the surrounding body portion of the cooled core.

6. Injection molding apparatus as claimed in claim 1 wherein the at least one cooled core comprises an insert integrally seated in the elongated body portion to form the front end of the cooled core, the insert having the plurality of spaced openings extending outwardly therethrough.

7. Injection molding apparatus as claimed in claim 6 wherein the outwardly extending spaced openings are radially extending bores.

8. Injection molding apparatus as claimed in claim 7 wherein the insert has a generally flat front end and a generally cylindrical outer surface fitting into a portion of the elongated body portion having a cylindrical inner wall, and the rearwardly and inwardly extending cooling fluid flow means comprises a plurality of spaced L-shaped grooves in the cylindrical outer surface and flat front end of the insert, each L-shaped groove having a rear end and an inner end, the rear end being connected to the outer end of one of the radially extending bores, the inner end being connected to the first cylindrical space extending rearwardly between the cooling tube and the surrounding body portion of the cooled core.

9. Injection molding apparatus as claimed in claim 8 wherein the front portion of the at least one cooled core comprises a head which is substantially larger in diameter than the rest of the cooled core.

\* \* \* \* \*